United States Patent [19]
Nishiwaki

[11] Patent Number: 6,015,521
[45] Date of Patent: *Jan. 18, 2000

[54] METHOD FOR TREATING CARBONACEOUS CONDUCTIVE MATERIAL FOR RESIN DISPERSION

[76] Inventor: Atsushi Nishiwaki, 1-11, 2-chome, Funakoshi-cho, Chuo-ku, Osaka-shi, Osaka, Japan

[*] Notice: This patent is subject to a terminal disclaimer.

[21] Appl. No.: 08/890,556

[22] Filed: Jul. 9, 1997

Related U.S. Application Data

[62] Division of application No. 08/581,367, Dec. 29, 1995, Pat. No. 5,686,183.

[30] Foreign Application Priority Data

Sep. 19, 1995 [JP] Japan .................................. 7-240352

[51] Int. Cl.$^7$ .................................................. C04B 35/00
[52] U.S. Cl. ............................ 264/105; 252/511; 252/29; 252/22; 524/495; 524/496; 524/424; 524/588; 524/589
[58] Field of Search ........................... 264/105; 106/472; 252/511, 500, 510, 11, 22, 29; 205/125, 159, 162, 164, 166, 205; 524/495, 496, 424, 588, 589

[56] References Cited

U.S. PATENT DOCUMENTS

| | | | |
|---|---|---|---|
| 4,663,230 | 5/1987 | Tennent | 428/367 |
| 4,705,646 | 11/1987 | Dupert et al. | 252/51 |
| 5,078,936 | 1/1992 | Parish et al. | 264/105 |
| 5,431,844 | 7/1995 | Nishiwaki | 252/511 |
| 5,536,386 | 7/1996 | Ferrier et al. | 205/125 |

*Primary Examiner*—Merrick Dixon
*Attorney, Agent, or Firm*—Wenderoth, Lind & Ponack, L.L.P.

[57] ABSTRACT

A method for producing a highly uniform dispersion of a carbonaceous conductive material for incorporation into a resin to achieve an excellent conductivity by acid-treating fine particles of the carbonaceous conductive material, and then crushing the resultant treated particles in a mill.

10 Claims, No Drawings

METHOD FOR TREATING CARBONACEOUS CONDUCTIVE MATERIAL FOR RESIN DISPERSION

This is a divisional application of Ser. No. 08/581,367, filed Dec. 29, 1995 now U.S. Pat. No. 5,686,183.

FIELD OF THE INVENTION

The present invention relates to a method of manufacturing a carbonaceous conductive material for resin dispersion. More particularly, the present invention relates to a novel easy-handling method of manufacturing a carbonaceous conductive material for resin dispersion, which is useful in a wide range of applications including paints, ink, rubber and plastic moldings and excellent in dispersibility and which achieves high conductivity.

PRIOR ART AND PROBLEMS

Resin materials imparted with conductivity for applications such as paints, ink, rubber and various plastic moldings have conventionally been used. Known conductive resin materials include ones manufactured by blending a metallic powder, metallic fibers, carbon black or carbon fibers as a conductive filler with resins.

Among these materials, carbon black and carbonaceous conductive materials such as carbon fibers are most commonly used as blending ingredients of conductive resin materials. However, such a carbonaceous conductive material added with the aim of imparting conductivity was hard to disperse into a resin as compared with general carbon black, and it was absolutely impossible to inhibit conversion into lumps of these conductive materials caused by secondary aggregation. It was therefore difficult to achieve uniform dispersion and impart a high conductivity to simultaneously satisfy formability requirements.

For example, at the present level of technology, it is very difficult to achieve a highly uniform dispersion by dispersing a slight amount of a carbonaceous material into a resin in the case not only of conductive carbon materials such as Ketchen black, and acetylene black, known to impart a high conductivity, but also of dispersing carbon fibril into a resin such as an extra-fine fibrils, currently attracting the general attention as a new carbon material (for example, those fibrils disclosed in the U.S. Pat. No. 4,653,230 and Japanese Provisional Patent Publication No. 62-500,943).

To cope with this difficulty, therefore, it has been a conventional practice to impart flexibility to a resin through heating and mixing or the use of a plasticizer, and then directly injecting a conductive material as a method for dispersion of these carbonaceous conductive material. These methods are however defective in that degeneration or deterioration of the resin itself may occur, and the properties of the resin compositions and the fields of application thereof are limited.

In order to achieve uniform dispersion of a conductive material and obtain a high conductivity by the addition of a slight amount, it is necessary to increase the contact probability of particles of the conductive material while reducing the contact resistance between particles. The carbonaceous material as a conductive material is however low in wettability with a solvent and a resin matrix. In addition, while particles of a larger specific surface area are preferable for imparting conductivity, particles of a larger specific area are more liable to aggregate, forming an aggregate having a chain-like or fringed (oval) shape. It is not easy to break this aggregate, thus still posing important problems to be solved before achievement of uniform dispersion and a satisfactory conductivity of the carbonaceous conductive material.

The present invention was developed in view of the circumstances as described above, and has an object to so the defects in the conventional carbonaceous conductive materials, achieve a high conductivity and provide a novel method of manufacturing a carbonaceous conductive material for resin dispersion capable of being uniformly dispersed.

SUMMARY OF THE INVENTION

As means to solve the above-mentioned problems, the present invention provides a method of treating a carbonaceous conductive material for resin dispersion, which comprises the steps of acid-treating, fine particles, and then crushing the resultant treated particles in a mill.

The present invention provides also embodiments of the above-mentioned manufacturing method, comprising treating the particles with a mineral acid or reducing the particles to an average particle size of up to 50 $\mu$m.

DETAILED DESCRIPTION OF THE INVENTION

The method of the present invention is essentially characterized by acid treatment and crushing in a mill. The acid treatment removes impurities entrapped from the synthesizing and manufacturing processes, which remain in the carbonaceous conductive material, particularly such metallic constituents as iron and aluminum serving as catalytic components, thus permitting remarkable improvement of dispersibility during subsequent crushing.

In the conventional art, it has not been easy to achieve uniform dispersion of the carbonaceous conductive material, and therefore the degradation of the quality of the resin and the composition thereof, as well as the limitation of the fields of application have been inevitable. In the present invention, in which an acid treatment, i.e., washing, and subsequent crushing in a mill improve uniform dispersibility into the resin, it is possible to achieve a satisfactory conductivity even with a slight amount of carbonaceous material added to the resin.

The acid treatment in the method of the present invention is possible with any of various acids. Particularly, a mineral acid easily available at a low cost can be appropriately used, including, for example, hydrochloric acid, sulfuric acid, nitric acid and phosphoric acid. Various substances appearing as acids are also effective, including organic acids and complexes.

In this acid treatment, the weight ratio of acid should be within a range of from about 0.01 to 0.50 relative to the carbonaceous conductive material to be treated, and the acid may be an aqueous solution or a mixture with a solvent.

The acid treatment may be conducted, as required, under warming and heating treatment conditions.

After this acid treatment, the carbonaceous conductive material is water-rinsed, and after removal of acid components, crushed in a mill. Crushing is effected to reduce the average particle size to up to 50 $\mu$m, or more preferably, to 20 $\mu$m, or further more preferably, to up to 10 $\mu$m or even within a range of from 1 to 2 $\mu$m. Particle sizes should be uniform within a tight range of granular variation.

In this case, any of various type mills may be adopted, including, for example, a ball mill, a vibrating mill and a medium stirring mill which stirs and crushes particles together with a solvent.

Particularly, as the medium stirring mill crushes the material to form a slurry, the state of dissociation and the state of dispersion can be determined front changes in the granular and conductivity during conversion into slurry, thus making it possible to easily obtain a state of dispersion to improve conductivity, coloration, prevention of determination caused by heat or ultra-violet rays, and strengthening.

Among the known medium stirring mills of several types and structures, the annular continuous wet type stirring mill using crushing medium particles of zirconium or steel is available as a typical one. This mill crushes the material to be crushed by causing it to continuously flow into a gap between an inner cylinder and an outer cylinder at a controllable peripheral speed, together with the crushing medium. The mill is capable of crushing the material to a submicron size, and is characterized by easy control of granular variation distribution. Various mills including known ones are now available within this type of stirring mill.

A solvent is used upon kneading and crushing the material in the medium stirring mill. With a view to a mixing the resultant kneaded slurry with the resin matrix, selection of a solvent should preferably be made with due regard to miscibility with resin, separability from resin, operability and safety. Usually applicable solvents include aromatic hydrocarbon solvents such as toluene and xylene, organic solvents such as dioxane, THF and ether, aliphatic hydrocarbon solvents such as pentane and hexane, halide hydrocarbon solvents, and glycol such as diethylene glycol.

A slurry may be prepared by the use of a commercially available small-sized medium stirring mill under conditions including a solid concentration within a range of, for example, from 2 to 10%, a throughput within a range of from 300 to 800 g/min, and operation at the room temperature. These figures are not of course limitative. It is needless to mention that these conditions should be selected in response to the type and structure of the mill, the target particle size to be achieved by crushing, and the kind and size of the covered carbonaceous conductive material.

While there is no particular limitation of kind for the carbonaceous conductive material in the present invention, preferable ones include known carbon black such as Ketchen black, Balkan XC72, and acetylene black which permits achievement of a high conductivity with the use of a slight amount of carbonaceous material, or any of the above-mentioned carbon fibrils which have an unique extra-thin structure and intrinsic properties may be used.

According to the present invention, the carbonaceous conductive material resulting from the acid treatment and crushing in the mill as described above is then dispersed in the resin.

Mixing and dispersion into the resin matrix may be performed through master-batch production or may be made into a composition for the product. There is no particular limitation as to the kind of resin.

The resin may be a polymer component itself, or a corresponding monomer or pre-polymer may be used to ensure uniform dispersion while causing a setting reaction.

Applicable thermoplastic resins include an acrylonitrile-butadiene-styrene resin (ABS resin), acrylonitrile-ethylene/propylene-styrene resin (AES resin), methyl methacrylate-butadiene-styrene resin (MBS resin) acrylonitrile-butadiene-methyl methacrylate-styrene resin (ABM resin), acrylonitrile-n-butyl acrylate-styrene resin (AAS resin), rubber denatured polystyrene (high impact polystyrene), polyethylene resin, polypropylene resin, polystyrene resin, poly- methyl methacrylate resin, polyvinyl chloride resin, cellulose acetate resin, polyamide resin, polyester resin, polyacrylonitrile resin, polycarbonate resin, polyphenyleneoxide resin, polyketone resin, polysulfon resin, polyphenylene sulfide resin, fluorine resin, silicon resin, polyimide resin, benzylbeneimidazole resin, a polyamide elastomer resin; and applicable thermosetting resins include a phenol resin, urea resin, melamine resin, xylene resin, diarylphthalate resin, epoxy resin, aniline resin, furan resin, and a polyurethane resin.

The carbonaceous conductive material may be mixed with any of these resins at an appropriate ratio which should preferably be within a range of from 5 to 40 weight parts of the carbonaceous conductive material relative to 100 weight parts of the target resin material. To the largest resin, known additives including a filling agent, a softening agent, a plasticizing agent, a processing aid, an age resister, an ultraviolet absorption agent or a foaming agent such as other carbon fibrils, carbon black, silica, diatomaceous earth, crushed lime, talc, clay, mica, calcium silicate, magnesium silicate, glass powder, calcium carbonate, barium sulfate, zinc carbonate, titanium oxide, alumina, glass fibers, other carbon fibers, and organic fibers may be mixed as required.

Now, the embodiments of the present invention will be described in further detail by means of examples.

EXAMPLES (Example 1)

To 10 g of fibril having an average lump diameter of 80 µm and a maximum diameter of 140 µm, which was an aggregate of fine carbon fibril having a diameter of 150 A and a length of 20 µm, each of the following acids was mixed while stirring in accordance with any of the following specifications:

No. 1: HCl(1:1), 100 ml

No. 2: $HNO_3$ (1:1), 100 ml

No. 3: $H_2SO_4$ (1:1, 100 ml and the resultant mixture was electrically heated (about 50 to 70° C.) for about ten minutes in a draft chamber.

Then, pure water was added, and after stirring, the carbon fibril, the precipitate, and filtrate were separated by filtration through a filter paper.

Subsequently, the precipitate was washed with pure water until the volume of the filtrate became 1,000 ml, and the resultant precipitate was dried in a drier by holding at 100° C. for 12 hours.

Finally, after filtering the precipitate, water was evaporated.

Then, each of Nos. 1 to 3 was crushed to an average particle size of about 20 µm in a ball mill made of tephron.

For the carbon fibril after crushing, dispersibility was evaluated.

Another sample (No. 4) crushed without acid treatment was also evaluated as to dispersibility for comparison with Nos. 1 to 3.

This evaluation was conducted by weighing 1 g from each of samples Nos. 1 to 4, putting the samples in each settling tubes (100 ml), adding 100 ml toluene respectively, and after stirring, observing the sedimentation thereof.

The results permit confirmation that the upper portion of the solution becomes transparent along with the progress of sedimentation of carbon fibril, and the degree of blackening increases in the lower portion. The samples Nos. 1 to 3 which were acid-treated and then crushed, light transmissivity becomes sequentially smaller from the upper portion toward the lower portion. In the sample No. 4 which was not acid-treated, in contrast, is poor in dispersibility, settling while taking the form of cloudy collective layers at a high sedimentation velocity.

The sedimentation velocity was evaluated by using a white light and measuring changes in the right of the light transmissivity of 75% in accordance with the light transmission method. The results are shown in Table 1.

TABLE 1

| Sample No. | Height of light transmissivity of 75% (mm) | | |
|---|---|---|---|
| | 1 min after | 5 min after | 10 min after |
| No. 1 | 93 | 44 | 36 |
| No. 2 | 93 | 50 | 38 |
| No. 3 | 97 | 46 | 37 |
| No. 4 | 92 | 25 | 16 |

For the samples Nos. 1 to 3, presence of iron (Fe) and aluminum (Al), considered to be constituents of catalyst used during manufacture or the fibril, was observed in the filtrate. The values of concentration in 1 l of the filtrate as determined by the ICP emission spectroscopic analysis are shown in Table 2.

TABLE 2

| Sample | Fe (ppm) | Al (ppm) |
|---|---|---|
| No. 1 | 23.8 | 5.3 |
| No. 2 | 20.3 | 3.7 |
| No. 3 | 22.0 | 7.9 |
| Washed with pure water | 2.0 | 0.2 |

These results suggest that demetallization was effectively accomplished by the acid treatment which improved dispersibility after crushing.

Comparison of the acid-treated samples Nos. 1 to 3 and the sample No. 4 not acid-treated demonstrates that the time required for crushing to a prescribed average particles size varies as follows when that for the sample No. 1 is assumed to be 1:

No. 2: 1.2
No. 3: 1.1
No. 4: 15.5 thus suggesting a remarkable improvement of efficiency brought about by the acid treatment.

(Example 2)

An annular continuous wet type stirring mill (Copol mill made by Sinko Pantec Co., Ltd.) was used as the medium stirring mill. The structure and operating specifications for this mill were as follows:

Medium (diameter): Zirconium (0.5 to 1.5 mm dia.)
Crushing gap: 6.5 mm
Medium packing ratio: 70%
Rotor peripheral speed: 13 m/second
Supply pressure: 0.2 to 0.5 kg/cm$^2$ Under these conditions, the fibril of the sample No. 1 obtained in Example 1 was mixed with toluene to bring the concentration to 4%, and the mixture was stirred at a rate of treatment of 500 g/minute. This treatment was carried out twice.

Kneaded slurry containing crushed carbonaceous conductive material having a maximum particle size of 2.6 μm and an average particles size of 1.3 μm was combined from this treatment. This kneaded slurry was mixed into an acryl resin so that the carbonaceous conductive material accounted for 3 wt. %. The conductive material showed satisfactory dispersion, with a specific resistance value of 1.0 kΩ cm, suggesting the achievement of an excellent conductivity. Almost no coating irregularities were observed in the use thereof in paint.

With a concentration of 6%, the material could be crushed to a maximum size of 2 to 3 μm by a single run of treatment, resulting in a similarly excellent conductivity. In all cases, optical microscopic observation (200 magnifications) permitted uniform dispersion of carbon particles.

(Example 3)

Ketchen black having an average particle size of 120 μm was acid-treated in the same manner as in Example 1, then crushed in the same manner as in Example 2, and blended in an amount of 3 wt. % (maximum particle size: 8 μm) with a resin, resulting in an excellent conductivity with a specific resistance of 2.6 kΩ cm.

According to the present invention, as described above in detail, it is possible to achieve highly uniform dispersion of carbonaceous conductive material into a resin, permitting uniform mixture into a resin matrix and achievement of an excellent conductivity.

What is claimed is:

1. A method of treating a carbonaceous conductive material for resin dispersion which comprises treating fine particles of a carbonaceous conductive material with an acid, mixing the resulting carbonaceous conductive material with water to remove the acid therefrom and then crushing the resulting particles in a mill to reduce the size thereof.

2. A method according to claim 1 wherein the acid is a mineral acid.

3. A method according to claim 1 wherein the particles are reduced to a size up to 50 μm.

4. A method according to claim 3 wherein the particles have an average particle size of from 1 to 2 μm.

5. A method of producing a conductive resin composition containing fine particles of a carbonaceous conductive material uniformly dispersed therein which comprises treating particles of a carbonaceous conductive material with an acid, crushing the resulting particles of carbonaceous conductive material in a mill to reduce the size of the particles thereby producing said fine particles and uniformly mixing said fine particles in a resin to produce a conductive resin composition.

6. A method according to claim 5 wherein after acid treatment, washing the particles with water to remove the acid therefrom, mixing the resultant particles with a solvent and crushing the particles containing the solvent in a mill to further reduce the size of the particles.

7. The method according to claim 6 wherein the crushed resin particles containing the solvent are mixed with a resin to form a resin composition with the carbonaceous particles uniformly dispersed therein.

8. The method according to claims 6 or 7 wherein the solvent is miscible with the resin.

9. The method according to claim 8 wherein the solvent is an organic solvent.

10. The method according to claim 9 wherein the particles mixed with the resin have an average particle size of up to 50 μm.

* * * * *